Figure 1:
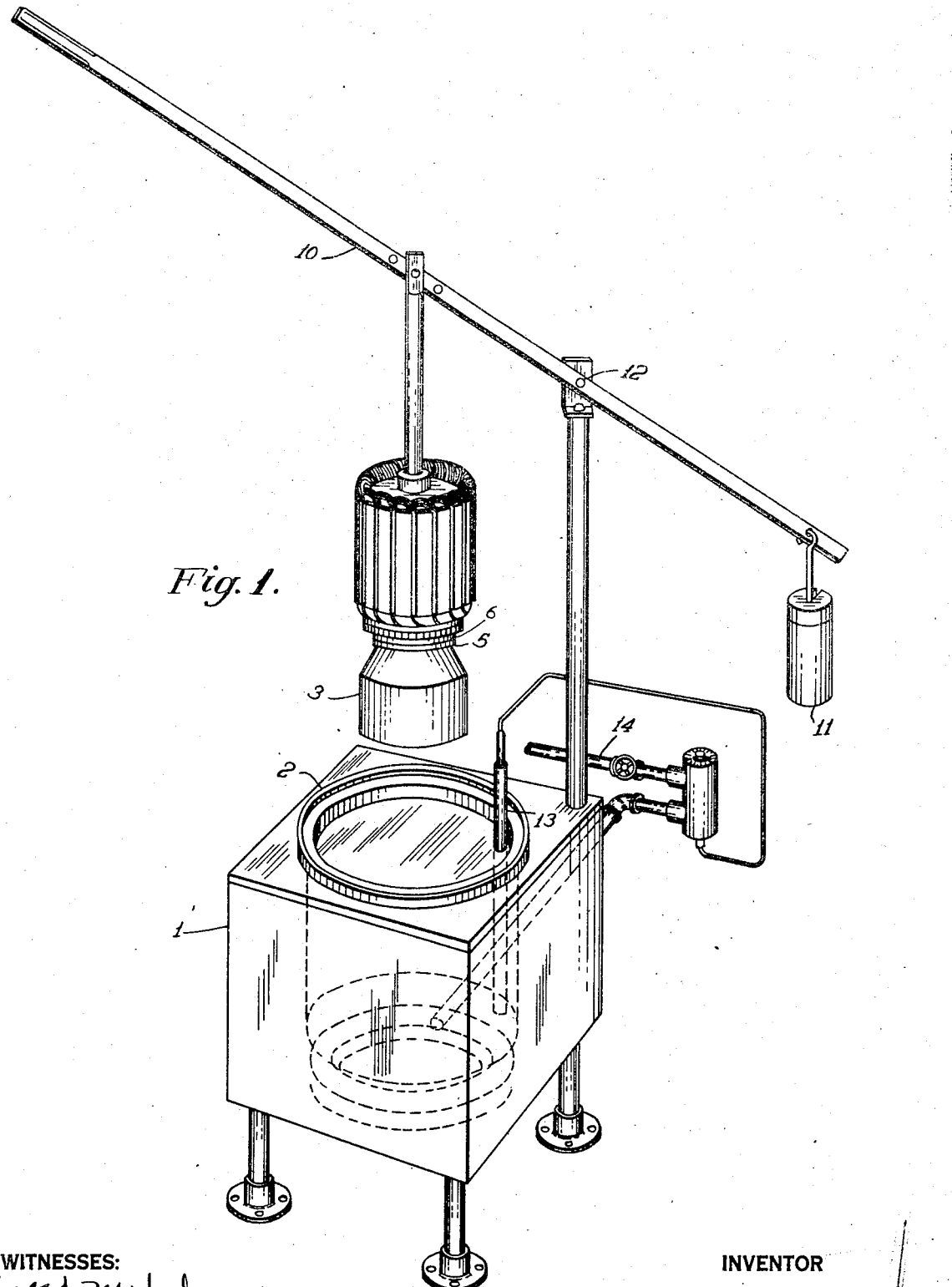

Dec. 2, 1941.   P. L. LENZ   2,264,703
APPARATUS FOR SOLDERING COMMUTATORS
Filed Aug. 18, 1939   2 Sheets-Sheet 1

WITNESSES:
Edward Michaels
Wm. C. Groome

INVENTOR
Peter L. Lenz.
BY
Paul E. Friedemann
ATTORNEY

Dec. 2, 1941.   P. L. LENZ   2,264,703
APPARATUS FOR SOLDERING COMMUTATORS
Filed Aug. 18, 1939.   2 Sheets—Sheet 2

WITNESSES:

INVENTOR
Peter L. Lenz.
BY
Paul E. Friedemann
ATTORNEY

Patented Dec. 2, 1941

2,264,703

UNITED STATES PATENT OFFICE 2,264,703

APPARATUS FOR SOLDERING COMMUTATORS

Peter L. Lenz, Edgewood, Pa., assignor to Westinghouse Electric & Manufacturing Company, East Pittsburgh, Pa., a corporation of Pennsylvania Application August 18, 1939, Serial No. 290,778

6 Claims. (Cl. 113—59)

My invention relates to the manufacture of commutator-equipped dynamo electric machines and more particularly to apparatus for soldering coil leads to commutator bar necks.

To better understand the objects of my invention and the contribution I have made to the art, a brief reference to prior art apparatus and the method of operation may not be amiss.

In the soldering of commutators, a process called "pot soldering" is generally used. This process makes use of one or two (more often two) specially shaped vessels for the melting of the solder. Disposed adjacent to and connected to each of these vessels is a shallow annular trough. This annular trough has to fit fairly accurately the diameter of the commutator of the particular armature that is to have its coil ends soldered to the commutator bar necks. This trough has to be of fairly heavy casting and has an annular heating element, as a gas burner, disposed below it so that the solder remains fluid or molten when it is caused to flow into the trough.

To effect the soldering, the commutator bars of an assembled armature are passed through the opening of the circular trough so that the necks rest in the trough, and the coil ends are also disposed into the trough. A plunger is then inserted in each of the vessels containing the molten solder so that the solder spills out into the trough and thus surrounds the coil ends and commutator bar necks.

Asbestos packing is placed on an inner ledge of the trough to prevent spilling of solder and to prevent molten solder from getting into contact with the commutator. Asbestos packing is also placed adjacent the armature to prevent solder from getting into portions of the coils not requiring the presence of any solder.

This prior method requires a group of specially designed solder-melting vessels and a specially designed cast iron trough for each size of armature that needs soldering. Further the asbestos packings are difficult to put in place and to maintain in position. The result is that solder very frequently gets on the commutator bars and also on coil parts.

The positioning of the asbestos backing is time consuming, and after a soldering operation the commutator often requires careful cleaning and the coils require cleaning.

Further, for all high temperature dynamo-electric machines such as are used on airplanes and many other applications, a high temperature solder is necessary so that the soldered connection may not become injured by the high temperature operation and the solder lost by centrifugal action of the rotor element. This means, with the prior art scheme, that the temperature in the trough which contains only a relatively small amount of solder would have to be maintained very high to prevent chilling of the solder when it is brought in contact with the trough and the commutator bars or necks and the temperature would have to be maintained at a high point for a relatively long time period. This means that the heat conducted away from the commutator necks heats the entire rotor including the coils and commutator thus annealing the commutator bars and damaging the mica insulation and the bond for the mica between the commutator bars and also causes melting of certain constituents of the insulation and the coils. It thus happens with the prior art method that after an attempt at soldering a rotor has been made, the commutator falls to pieces and the insulation flows out of the coil windings.

One object of my invention is to eliminate all the enumerated defects of the prior art apparatus used for soldering commutators.

Another object of my invention is the provision of soldering apparatus for commutators that is simple, reliable, easy to make, low in cost, and requires a simple and labor saving method in use.

Figure 2:
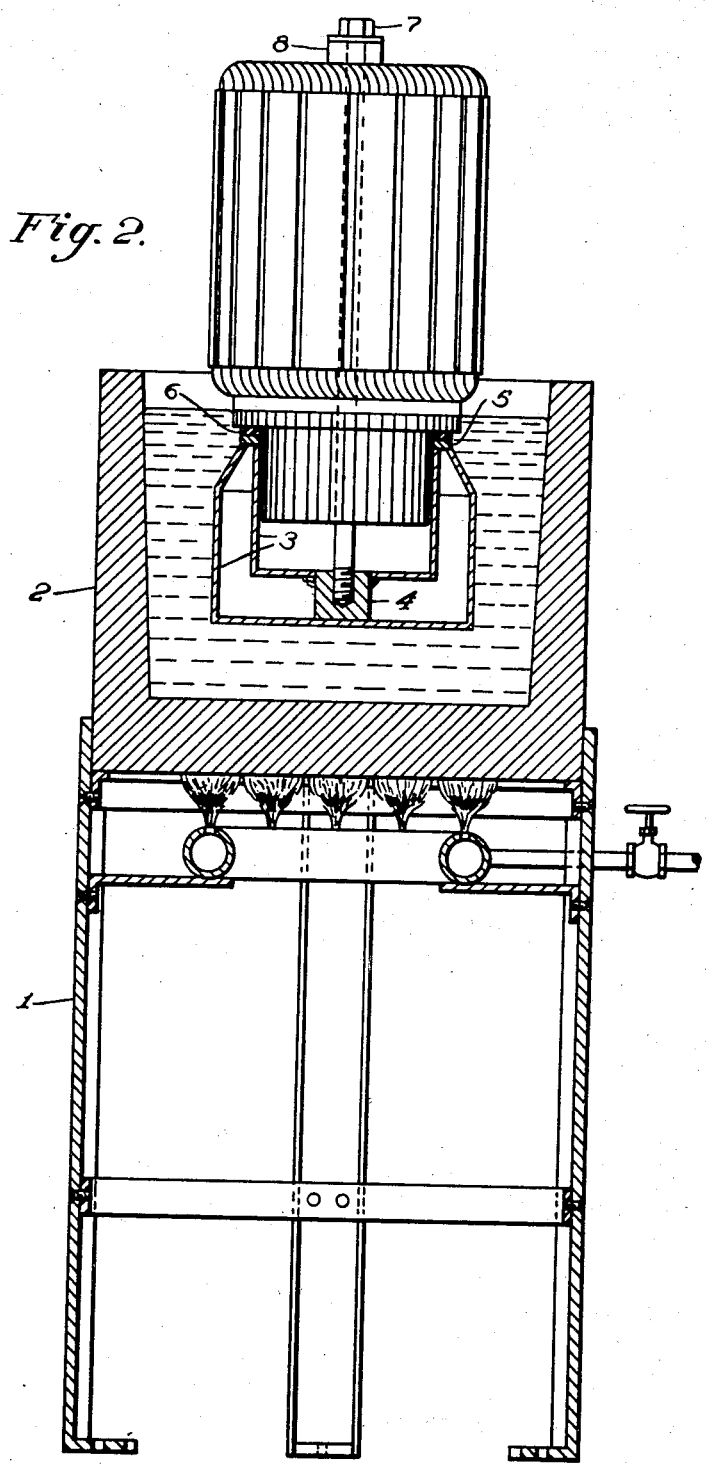

Other objects and advantages will become more apparent from a study of the following specification when done in conjunction with the accompanying drawings, in which:

Figure 1 is a perspective view of the apparatus used for the novel soldering operation; and Fig. 2 is a vertical cross-sectional view of my novel apparatus.

In the drawings reference character 1 designates a conventional solder pot heater having a burner, supporting legs, and a ledge for holding the solder pot 2. The solder pot 2 is of conventional design and may include a carrying bail (not shown), or any other means that facilitates moving the pot from place to place.

My new apparatus, see Fig. 2, comprises a bell-shaped double walled container 3. The walls are made of inexpensive sheet metal and the walls are held in spaced relation at the bottom of the block 4 to which the walls may be welded in spots to give rigidity to the entire bell-shaped structure.

At the upper portion the walls are firmly secured to a cheap yet fairly rigid ring 5 fitting over the commutator. A ring or washer of asbestos backing 6 or any other heat resistant fibre, or felt as mineral wool, glass wool, or other fibre is placed snugly against the commutator bars and is then firmly pressed against the commutator bar necks by means of the bolt 7 threaded into block 4 and engaging the upper end of the armature by the cross piece 8 as shown.

The armature and the bell-shaped container housing the commutator is thus a unit and the operator, as one of the steps in the soldering of the commutator, merely immerses—"dunks"—the commutator end housing, bell and all, into the solder pot 2 just deep enough and holding it there just long enough to cause the molten metal to flow about the coil ends and commutator bar necks filling and wetting the surfaces desired. The purpose of the double walls of the container 3 is to provide an air space between the molten metal in the pot 2 and the commutator bars. The commutator is thus protected from the heat of the metal, but the commutator necks and coil ends are rapidly heated by the molten metal to cause effective wetting and thus a proper bond between the desired surfaces.

After the metal has penetrated into the desired spaces, the armature is removed from the pot and the bell-shaped container is removed after the solder has solidified to join the commutator necks and coil ends for application to the next armature.

The arrangement and general procedure is briefly this: The rotor, after having been provided with the bell shaped structure 3, is hooked onto the arm 10 which is provided with a counterweight 11 to substantially balance the rotor assembly on the pivot 12.

The solder pot 2 is provided with a temperature responsive device 13 which controls the fuel flow from the gas main 14 so that the temperature of the molten solder is automatically maintained at the desired temperature for most effective soldering.

Assuming the temperature of the solder is right, then the attendant operates lever 10 to move the bell 3 into the solder. After holding the assembly at the right depth and the right length of time to effect the desired wetting of the coil ends and commutator necks so that a film of solder connects them, the assembly is removed.

The rotor is then laid aside to permit hardening of the solder, after which the bell 3 is removed to be applied to a second rotor.

Since my apparatus holds the asbestos packing firmly against the commutator bars and also against the commutator bar necks, no solder gets in contact with the commutator bars and other parts of the armature. No subsequent cleaning is thus necessary. The cost of the armature is thus less.

My apparatus has been reduced to practice in various sizes and is being successfully used on commutators of various sizes.

From the foregoing discussion, the advantages should be obvious, however, a comparison of the factory costs between the prior art device and my novel apparatus will further show what a valuable contribution to the art my apparatus is.

The prior art devices have factory costs ranging from $650.00 to $2500.00 per unit, depending on the size of the dynamo-electric machine the devices are to accommodate, whereas my novel apparatus have factory costs of $5.00 to $25.00 per unit, depending on the size.

Further, with my novel apparatus and method of procedure, the high temperature solder is melted in a comparatively large pot where a large mass of the solder is at a high temperature and when the commutator end provided with the bell-shaped structure I show is inserted in the solder so that the commutator necks are just below the level of the molten solder, the temperature of the mass of solder is not changed appreciably and no chilling takes place at the commutator necks, yet the commutator necks are heated almost instantaneously or at least in a very short interval of time to a desired temperature somewhat above the solidifying temperature of the solder without giving the copper elements of the rotor time to conduct enough heat away from the commutator bar necks to heat any region of the rotor that is not to be heated. The solder thus flows into the region wetting the surface desired to be soldered and the rotor is removed from the solder in a relatively short time interval. The particular solder used is not important, but just for general information it might be stated that if a solder is used that solidifies at 306° C., which is ordinarily a high temperature solder, and the mass of solder in the pot is maintained at 450°, insertion of the rotor into the solder pot, even for the largest rotor is not likely to reduce the temperature of the solder more than 100°, namely to 350° C., so that the commutator neck bars are rapidly heated to 325° C., which is well above the 306° for solidification of the solder, and when the rotor is removed excess solder readily flows off and only the solder wetting the desired surfaces remains in position.

My invention is not to be limited to the particular showing I have made, because it is readily apparent that others skilled in the art, if apprised merely of the broad idea of my invention, can devise other arrangements for accomplishing the same or similar results. I, therefore, wish to be limited only by the scope of the appended claims and such prior art as may be pertinent.

I claim as my invention:

1. In apparatus for soldering the commutator bar necks to the coil ends of the armature of a dynamo-electric machine, in combination, a rigid heat resistant covering fitting over the commutator bars, a felt-like heat resistant packing disposed at the base of the commutator bars and engaging the covering and the bars to prevent any fluid from passing between the covering and the commutator bars, and means for firmly clamping the covering on the commutator and against said packing and a solder pot, containing molten solder, into which the commutator end of the armature of a dynamo-electric machine may be immersed to a depth sufficient to cause the molten solder to fill and solidify in the spaces between the commutator bar necks and coil ends of the armature.

2. In apparatus for soldering the commutator bar necks to the coil ends of the armature of a dynamo-electric machine, in combination, a rigid double walled heat resistant covering fitting over the commutator bars, felt-like heat resistant packing means disposed at the base of the commutator bars and engaging the covering and the bars to prevent any fluid from passing between the covering and the commutator bars, said packing means also disposed at the base of the commutator bar necks and engaging the covering and the base of said necks to prevent any fluid from filling undesired spaces at the base of the commutator bar necks, and means for firmly clamping the covering on the commutator and against said packings, and a solder pot, containing molten solder, into which the commutator end of the armature of a dynamo-electric machine may be immersed to a depth sufficient to cause the molten solder to fill and solidify in the spaces between the commutator bar necks and coil ends of the armature.

3. In apparatus for soldering the commutator bar necks to the coil ends of the armature of a dynamo-electric machine, in combination, a rigid, double-walled, leak-proof, heat-resistant covering chamber snugly fitting over the base of the commutator bars, and means for firmly clamping the covering on the commutator, and a solder pot, containing molten solder, into which the commutator end of the armature of a dynamo-electric machine may be immersed to a depth sufficient to cause the molten solder to fill and solidify in the spaces between the commutator bar necks and coil ends of the armature.

4. In apparatus for soldering the commutator bar necks to the coil ends of the coils of a dynamo-electric machine of the type utilizing a commutator, a generally bottle-like container disposed over the commutator, a second generally bottle-like container spaced from and surrounding the first container, said containers having their neck-portions connected to each other by a leak-proof connection and disposed to snugly fit in a leak-proof manner about the commutator below the commutator necks so that the commutator end of the machine, when the containers are in place, may be immersed in molten solder to solder the conductor, or coil, ends of the rotor to the commutator bar necks without causing any appreciable heating of the commutator.

5. In apparatus for soldering the commutator bar necks to the coil ends of the coils of a rotor of a dynamo-electric machine of the type utilizing a commutator, a generally bottle-like, leak-proof, double-walled, heat-resistant container fitted over the commutator and having its neck portion fitting snugly against the commutator below the commutator necks to prevent leakage of liquid past the connection, and means for holding the container in place, whereby the commutator end of the machine, when the container is in place, may be immersed in molten solder to solder the commutator necks to the conductor ends of the rotor without causing any appreciable heating of the commutator.

6. In apparatus for soldering the commutator bar necks to the coil ends of the coils of a dynamo-electric machine of the type utilizing a commutator, a generally bottle-like container disposed over the commutator, a second generally bottle-like container spaced from and surrounding the first container, said containers having their neck-portions connected to each other by a leak-proof connection and disposed to snugly fit in a leak-proof manner about the commutator below the commutator necks, means for holding the containers in place on the said machine, whereby the commutator end of the machine, when the containers are in place, may be immersed in molten solder to solder the conductor, or coil, ends of the rotor to the commutator bar necks without causing any appreciable heating of the commutator.

PETER L. LENZ.